US012760969B2

(12) United States Patent
Copple et al.

(10) Patent No.: US 12,760,969 B2
(45) Date of Patent: Oct. 13, 2026

(54) DOCUMENT REMEDIATION SYSTEM

(71) Applicant: Federal Bureau of Investigation, Washington, DC (US)

(72) Inventors: Amanda Copple, Inwood, WV (US); William C Beeler, Greencastle, PA (US)

(73) Assignee: Federal Bureau of Investigation, Washington, DC (US)

( * ) Notice: Subject to any disclaimer, the term of this patent is extended or adjusted under 35 U.S.C. 154(b) by 724 days.

(21) Appl. No.: 18/205,140

(22) Filed: Jun. 2, 2023

(65) Prior Publication Data

US 2023/0392867 A1 Dec. 7, 2023

Related U.S. Application Data

(60) Provisional application No. 63/348,059, filed on Jun. 2, 2022.

(51) Int. Cl.

| | |
|---|---|
| ***F26B 25/04*** | (2006.01) |
| ***A61L 2/00*** | (2006.01) |
| ***A61L 2/10*** | (2026.01) |
| ***F26B 5/04*** | (2006.01) |
| ***F26B 5/06*** | (2006.01) |
| ***F26B 25/06*** | (2006.01) |

(52) U.S. Cl.

CPC .............. *F26B 25/04* (2013.01); *F26B 5/042* (2013.01); *F26B 5/06* (2013.01)

(58) Field of Classification Search

CPC .. F26B 25/04; F26B 5/042; F26B 5/06; A61L 2/10; A61L 2/00

USPC ..................... 162/359.1; 34/111, 123, 85, 88

See application file for complete search history.

(56) References Cited

U.S. PATENT DOCUMENTS

| | | | | |
|---|---|---|---|---|
| 4,396,582 A * | 8/1983 | Kodera | A61L 2/18 53/167 |
| 2018/0343898 A1 * | 12/2018 | Alzeer | A23B 2/001 |

* cited by examiner

*Primary Examiner* — Deming Wan

(74) *Attorney, Agent, or Firm* — Jonathan W. Parthum; Robert T. Burns; Timothy L. Harney

(57) ABSTRACT

Disclosed is a document remediation system including a dryer configured to dry a document and output a dried document; one or more sensors configured to detect a moisture content of the document within the dryer; a cleaning device configured to receive the dried document, remove debris therefrom, and output a cleaned document; a sanitizer configured to receive the cleaned document, disinfect the cleaned document, and output a remediated document; a vacuum connected to at least one of the dryer, the cleaning device and the sanitizer and configured to remove document debris from one or more of the dryer, the cleaning device, and the sanitizer; and a transportation device interconnecting the dryer, the cleaning device and the sanitizer, the transportation device being configured to receive the document and convey the document through at least the dryer, the cleaning device, and the sanitizer.

18 Claims, 13 Drawing Sheets

DOCUMENT REMEDIATION SYSTEM

CROSS-REFERENCE TO RELATED APPLICATION

This Application claims the benefit of and priority to U.S. patent application Ser. No. 63/348,059 filed Jun. 2, 2022, which is hereby incorporated by reference in its entirety.

STATEMENT OF GOVERNMENT SUPPORT

The United States Government has rights in this invention pursuant to the employer-employee relationship of the Government to at least one inventor.

FIELD OF THE INVENTION

The present subject matter relates to document remediation and preservation.

BACKGROUND

Current archival conservationists specializing in books, manuscripts and documents remediate damaged library or archival items manually and in single or small batches of similar types, limiting the volume to smaller throughputs reliant upon availability of resources, space, and workers. Mass conservation techniques for most archival materials focus only on humidity and temperature control. Single or small batch preservation or restoration use limited technological components such as high efficiency particulate air (HEPA) filter vacuums, conservation brushes, steamers for humidification, chemicals for deacidification or pastes for mending, non-chemical vulcanized rubber, vinyl erasers, and Ph/alkaline detectors.

Drying documents usually requires rooms with tables and spaces blocked off from normal business activities. Manually separating wet and/or stuck together pages requires time and finesse to gently peel apart the pages without further damaging the document. Personnel currently utilize small HEPA-filtered vacuums to remove particulates and debris from damaged collections. This takes time as the attachments are not designed for clearing an entire page, but only small sections, which increases the number of passes required to remove all debris.

Further, safe handling is a large aspect of remediation to be able to functionally access and maintain the collection, as many remediation methods utilize chemical-based treatments, which can persist in a remediated collection and cause long-term handling issues. Individuals touching a damaged collection who are sensitive to the chemicals used may be injured as a result. Further, chemical-based remediation is not typically considered a treatment for library or archival collections. Few sanitation measures exist that are safe for long-term preservation of collections. A need therefore exists for improved document remediation systems and methods.

SUMMARY

Disclosed is a document remediation system including a dryer configured to dry a document and output a dried document; one or more sensors configured to detect a moisture content of the document within the dryer; a cleaning device configured to receive the dried document, remove debris therefrom, and output a cleaned document; a sanitizer configured to receive the cleaned document, disinfect the cleaned document, and output a remediated document; a vacuum connected to at least one of the dryer, the cleaning device and the sanitizer and configured to remove document debris from one or more of the dryer, the cleaning device, and the sanitizer; and a transportation device interconnecting the dryer, the cleaning device and the sanitizer, the transportation device being configured to receive the document and convey the document through at least the dryer, the cleaning device, and the sanitizer.

Also disclosed is a method of a method for remediating a document including the steps of receiving a document; drying the document; automatically adjusting a time for drying the document and outputting a dried document; cleaning the dried document, removing debris therefrom, and outputting a cleaned document; sanitizing the cleaned document and outputting a remediated document.

The foregoing paragraphs have been provided by way of general introduction and are not intended to limit the scope of the following claims. A detailed description of the features and embodiments of the present disclosure follows below.

BRIEF DESCRIPTION OF THE DRAWINGS

A description of the present subject matter including various embodiments thereof is presented with reference to the accompanying drawings, the description not meaning to be considered limiting in any matter, wherein.

DETAILED DESCRIPTION

Figure 1:
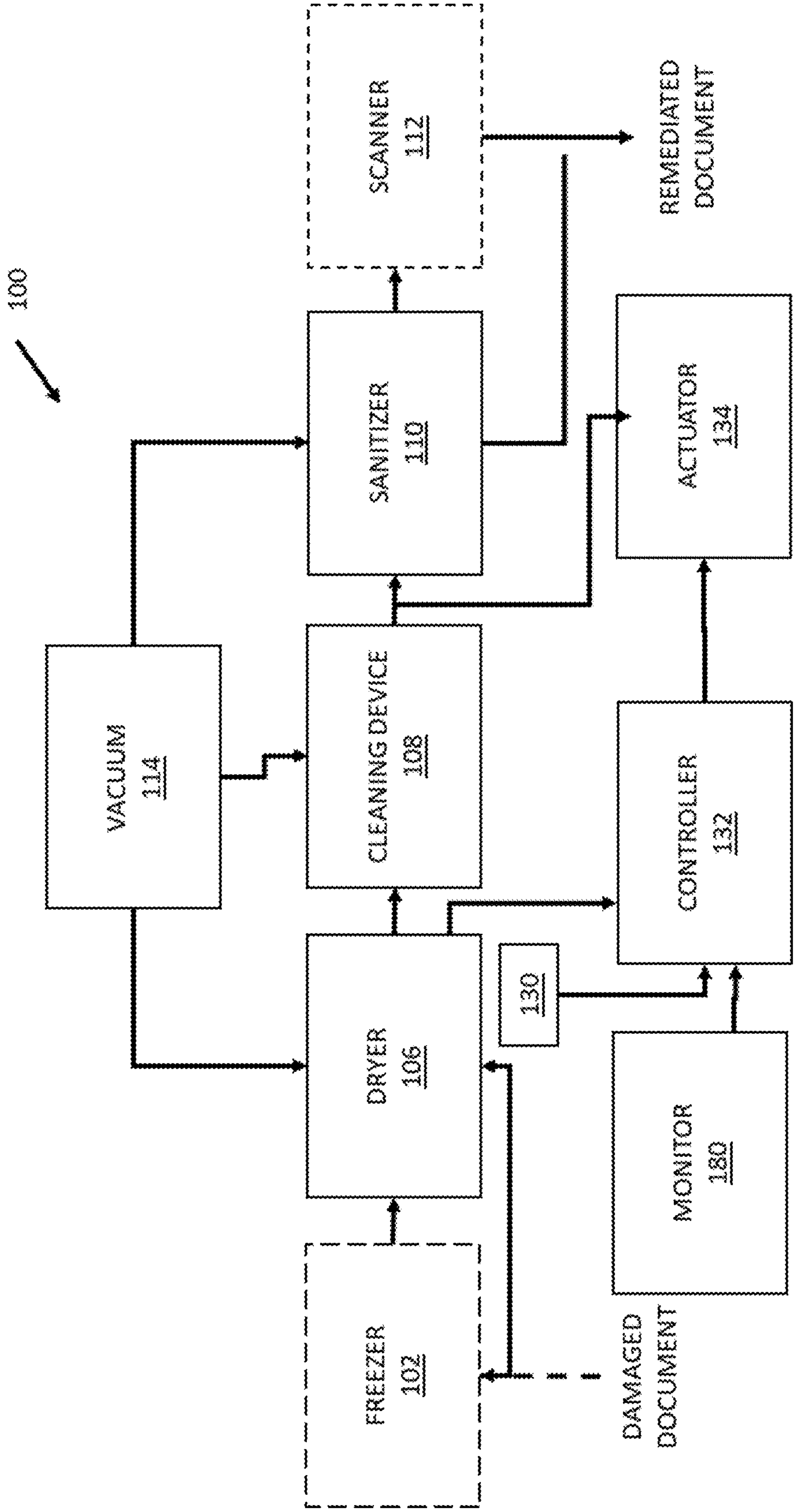
FIG. 1 illustrates a block diagram of an exemplary document remediation system.

The foregoing summary, as well as the following detailed description should be read with reference to the drawings in which similar elements in different drawings are numbered the same. The drawings, which are not necessarily to scale, depict illustrative embodiments and are not intended to limit the scope of the invention.

As used herein “substantially”, “relatively”, “generally”, “about”, and “approximately” are relative modifiers intended to indicate permissible variation from the characteristic so modified. They are not intended to be limited to the absolute value or characteristic which it modifies but rather approaching or approximating such a physical or functional characteristic.

In the detailed description, references to "one embodiment", "an embodiment", or "in embodiments" mean that the feature being referred to is included in at least one embodiment of the invention. Moreover, separate references to "one embodiment", "an embodiment", or "in embodiments" do not necessarily refer to the same embodiment; however, neither are such embodiments mutually exclusive, unless so stated, and except as will be readily apparent to those skilled in the art. Thus, the invention can include any variety of combinations and/or integrations of the embodiments described herein.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

It will be appreciated that as used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but can include other features not expressly listed or inherent to such process, method, article, or apparatus.

It will also be appreciated that as used herein, any reference to a range of values is intended to encompass every value within that range, including the endpoints of said ranges, unless expressly stated to the contrary.

It should also be noted that, in some alternative implementations, the functions illustrated as blocks can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks and/or flowchart illustrations can be implemented by special purpose hardware-based systems that perform the specified functions or acts, or combinations of special purpose hardware and computer instructions.

Referring now to the drawings, wherein like reference numerals designate identical or corresponding parts throughout the several views, the following description relates to a system and method for remediating and preserving documents.

FIG. 1 illustrates a block diagram of an exemplary document remediation system. In the exemplary embodiment shown, system 100 includes an optional freezer 102, a dryer 106, a cleaning device 108 (also referred to as a cleaner 108), a sanitizer 106, an optional scanner 112 (also referred to as a digitizer 112), a vacuum 114, and various other components. FIGS. 2-6 illustrate various views of the exemplary document remediation system 100. FIGS. 2-6 contain identifiers similar to those of FIG. 1, are described herein together, and like designations are repeated.

The exemplary embodiment of FIG. 1 optionally includes one or more freezers 102 for storing and freezing documents. Such freezers can include large walk-in insulated and enclosed temperature-controlled spaces containing documents in pallets or singularly on racks. In certain exemplary embodiments, documents are frozen via freeze drying using, for example, freeze dryers such as Parker freeze dryers or BMS CAT. Other freezers and/or freeze dryers known to those of skill in the art can be used in place of or in addition to these without departing from the scope of the present subject matter.

Certain exemplary embodiments optionally include at least one pallet (now shown) with at least one "H" channel for a pallet jack to slide beneath the pallet and pick it up. In certain exemplary embodiments, additional channels (now shown) are connected to an air source configured to force air through the one or more of the channels boxes of documents (not shown) on the pallet to circulate air more efficiently and effectively. For paper the benchmark is 7.2 cfm, 2.3 torr reducing to 0.1 torr for optimal sublimation to freeze-dry documents to less than 7% moisture content. Existing vacuum freeze dryers will get some of the documents to this level, but are unable to obtain this level for documents at bottom of boxes or in the middle of pallets. One box of documents (1 cubic foot) dried using known methods takes approximately 2 weeks to dry to less than 10% humidity. The "H" channel pallet configuration more evenly distribute air across all boxes and documents evenly with air at 7.2 cfm and 2.3 torr decreasing to 0.1 torr for even documents in the bottom or a box or in the middle of a pallet, rather than simply relying on air flowing top. Certain exemplary pallets include ports into the sides of the pallet configured to connect to an air source. In these exemplary embodiments, to allow extra air flow through the hoses connected and out of the pallets. Air from these pallets flows over documents on multiple levels, providing air flow commensurate to the air flow that would contact documents that were laid out like fruit, rather than in boxes as in certain exemplary embodiments disclosed herein. This prevents bottom boxes or boxes in the center from not being as dry as those on the outside.

Figure 2:
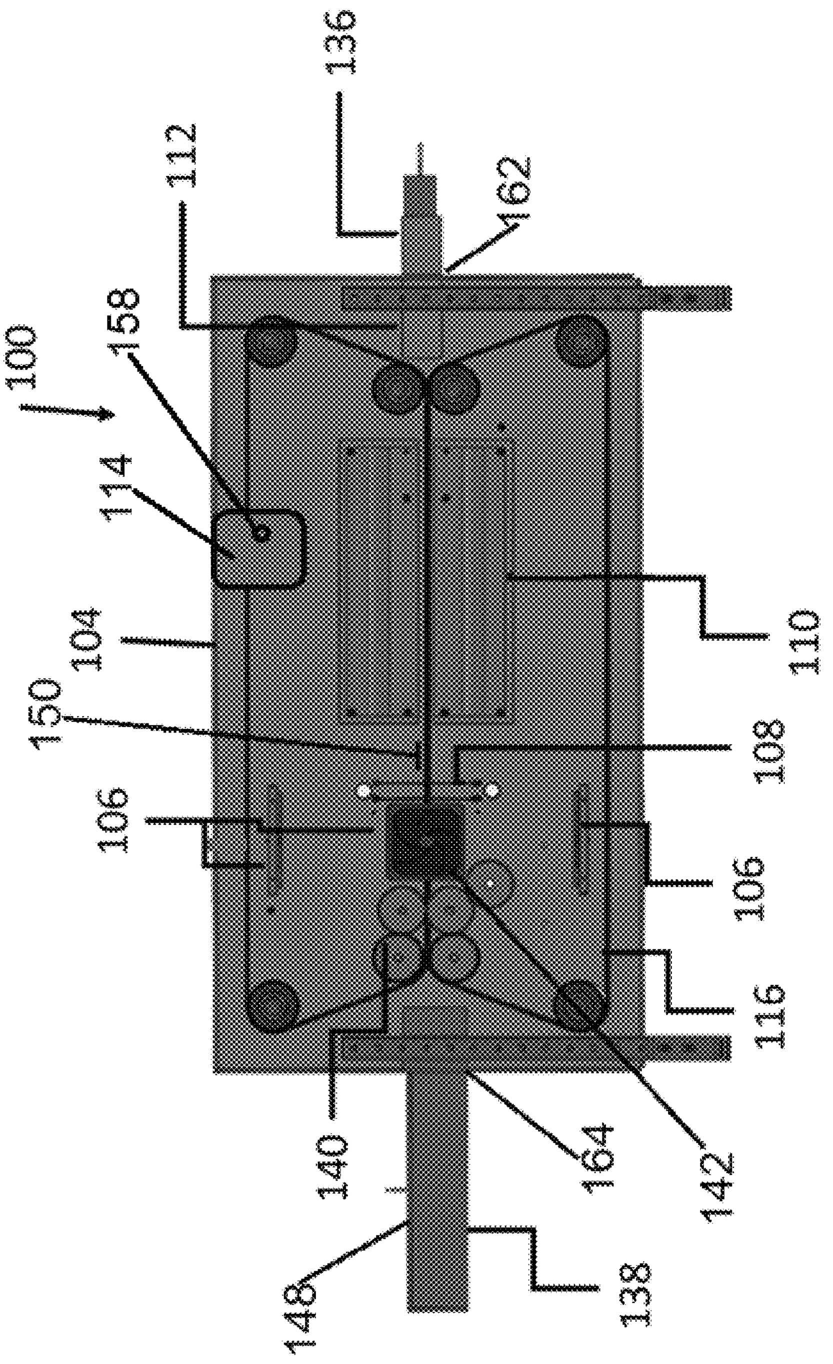
FIG. 2 illustrates a front view of an exemplary document remediation system.
Figure 3:
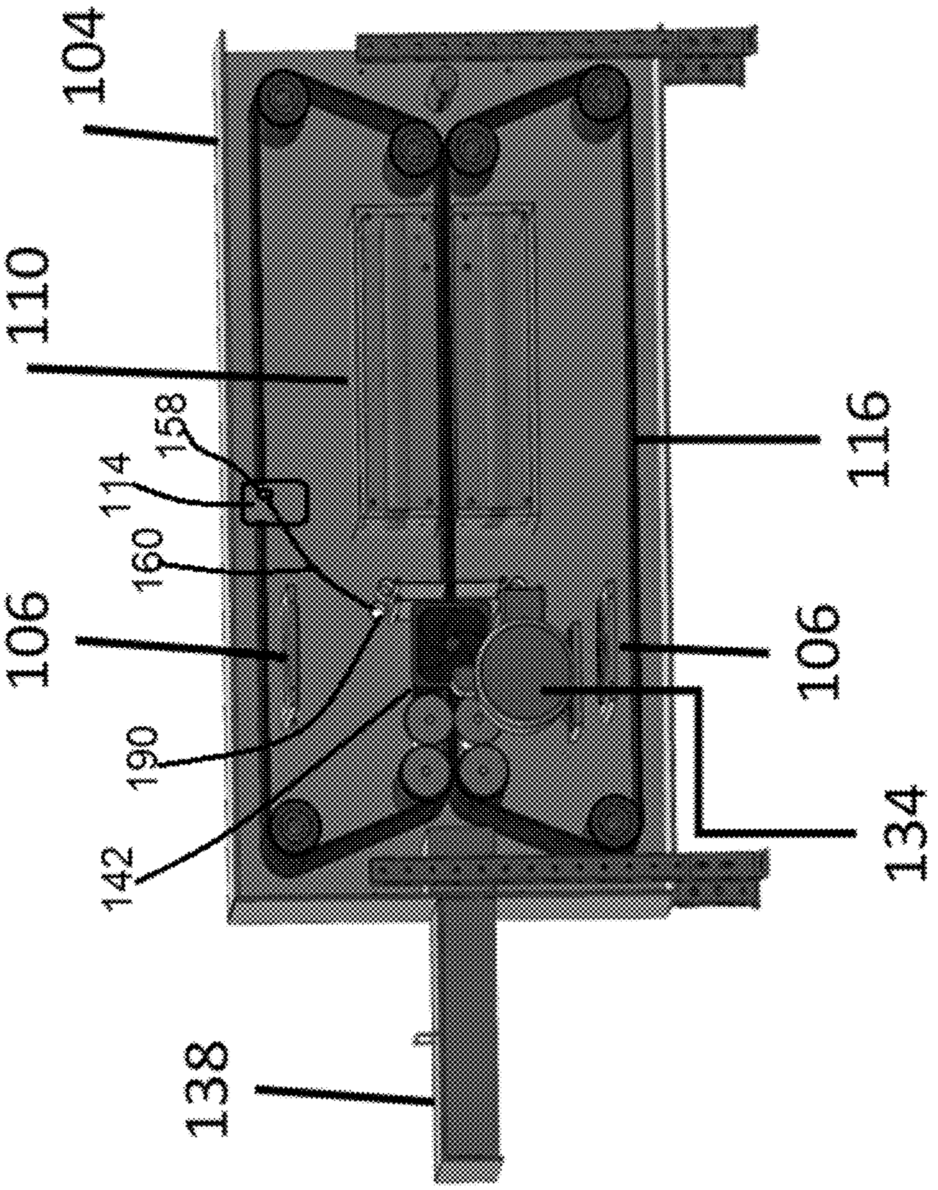
FIG. 3 illustrates a front view of an exemplary remediation system depicting an actuator location and removal of an exit tray.
Figure 4:
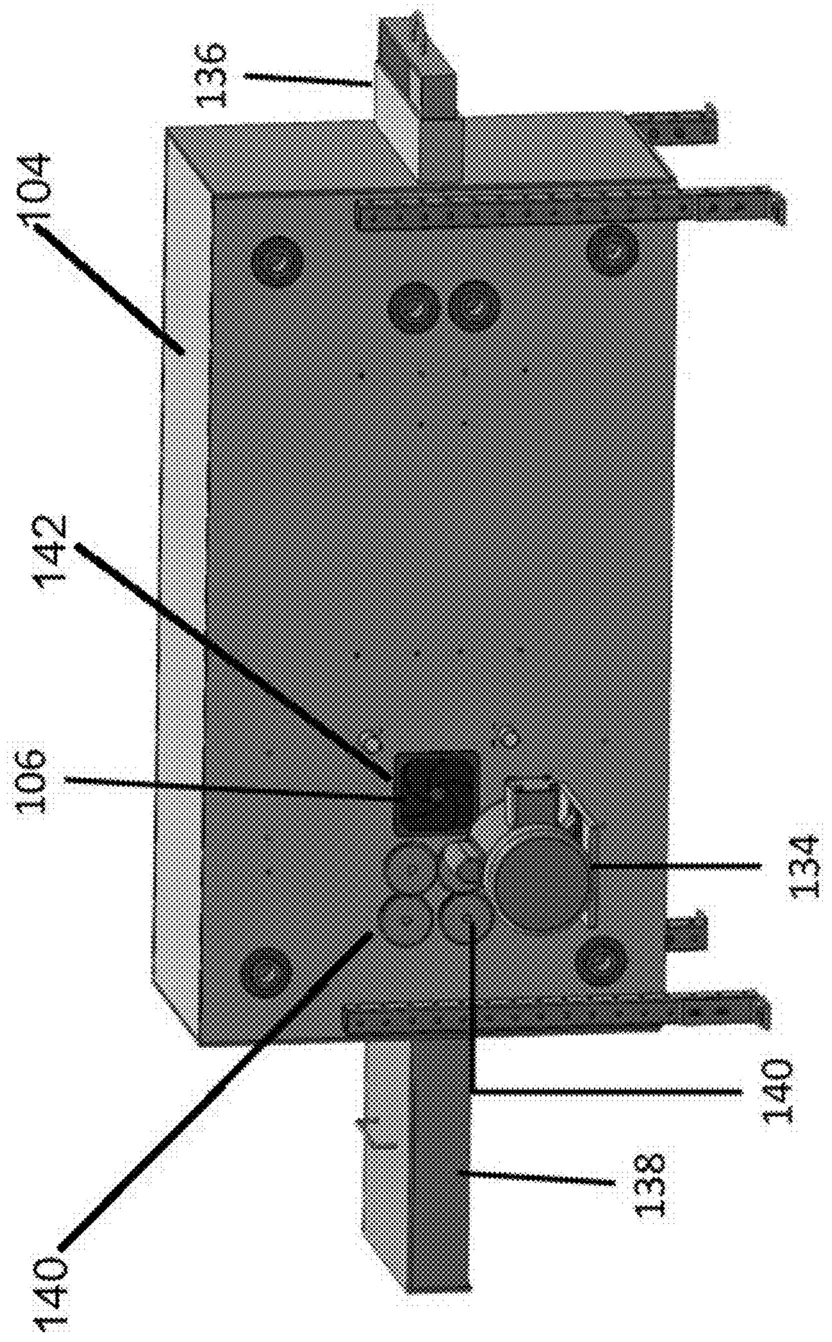
FIG. 4 illustrates another front view of an exemplary document remediation system.
Figure 5:
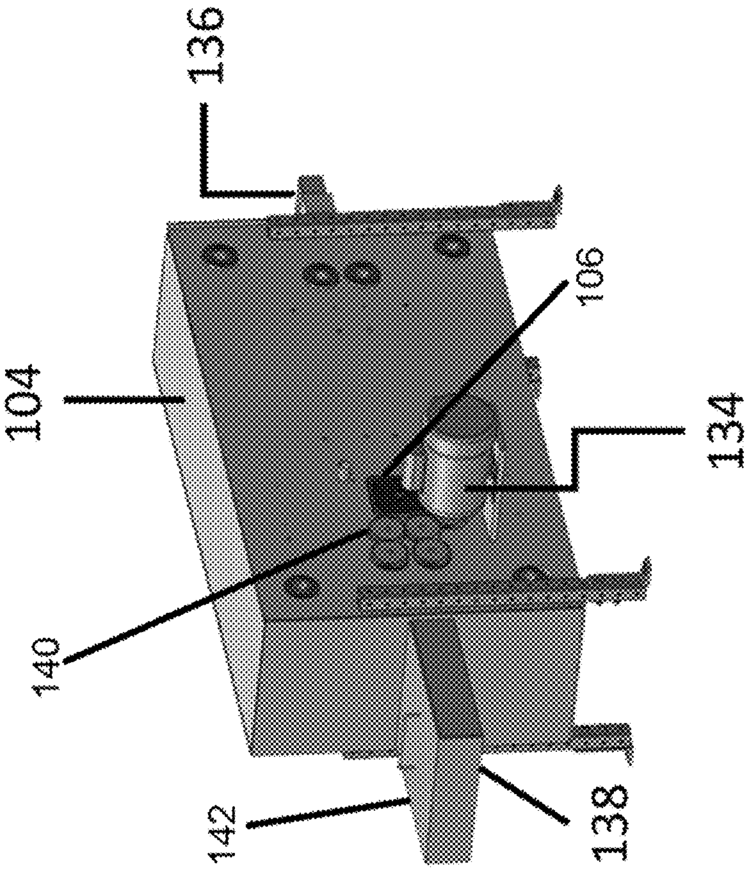
FIG. 5 illustrates a front perspective view of an exemplary document remediation system.
Figure 6:
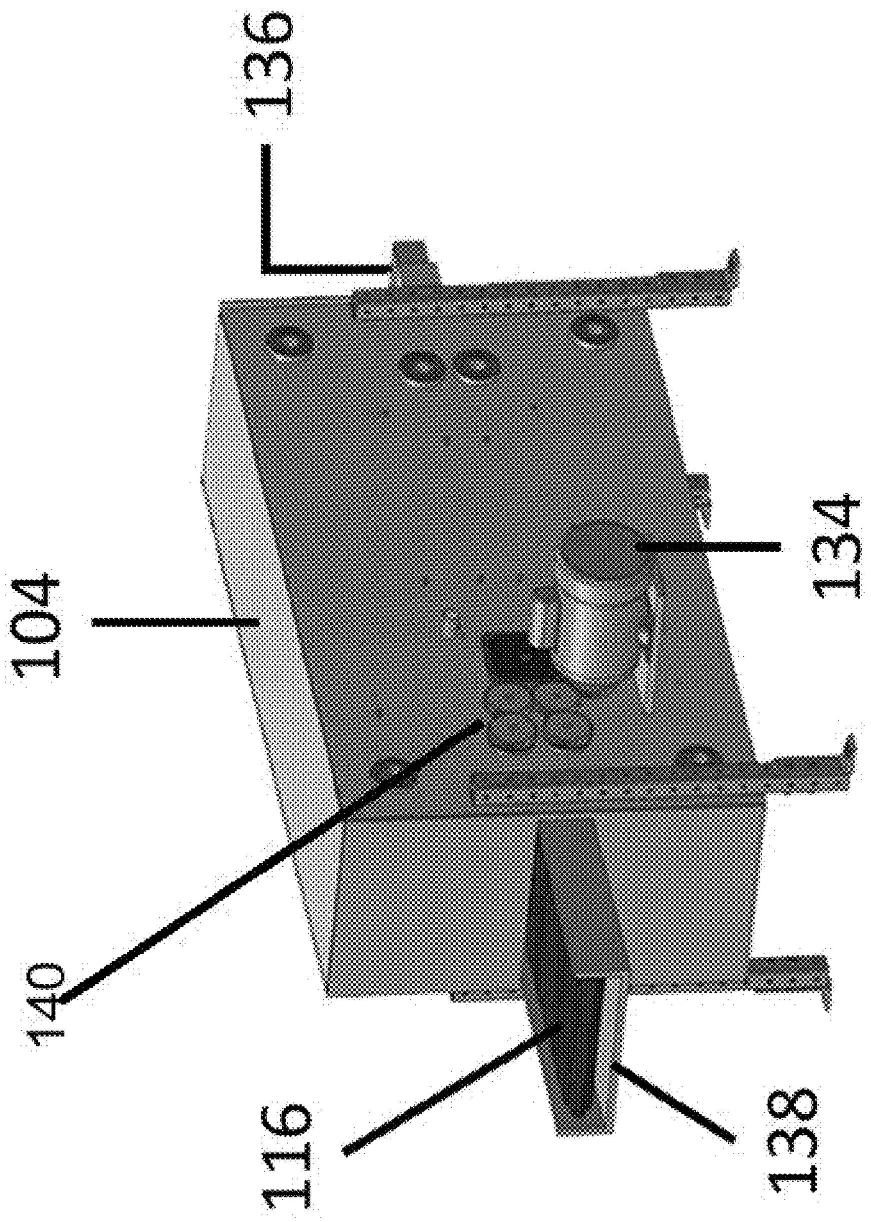
FIG. 6 illustrates another front perspective view of an exemplary document remediation system.
Figure 7:
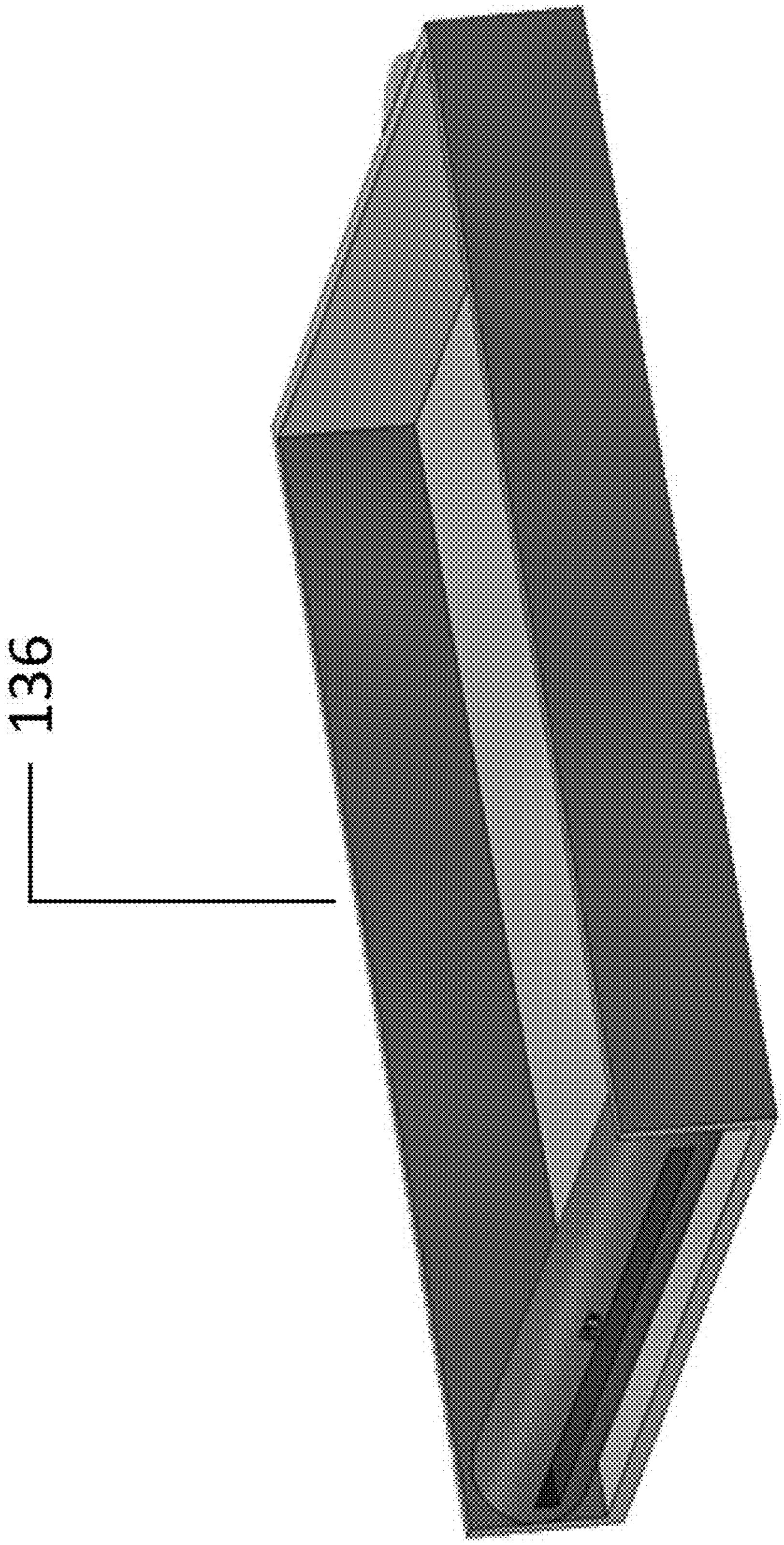
FIG. 7 illustrates a perspective view of an exemplary document remediation system input tray.

As shown in FIG. 2, system 100 includes a bio-containment system 104, also referred to as a housing 104. In one embodiment, housing 104 is a substantially sealed enclosure having openings 164 and 162 configured to receive trays 138 and 136 (see, e.g., FIG. 7). Trays 136/138 and/or openings 162/164 enable feeding and removing documents into and out of system 100. When the trays 136 and 138 are in a closed position, housing 104 is sealed. In the embodiment shown, housing 104 connects with vacuum 114, which provides a negative airflow through a HEPA filter thereby creating a microbial-free exhaust system. In certain exemplary embodiments, bio-containment system or housing 104 encloses or seals individual components, such that each individual component is connected to vacuum system 114 for negative air pressure and microbial-free exhaust through one or more HEPA filters. Alternatively, or in addition to, system 100 is positioned inside a negative air pressure room with HEPA filter ventilation.

In certain exemplary embodiments, housing 104 includes one or more access panels (not shown). Access panels provide access to the interior of housing 104 for maintenance, repairs, and emergency access to interior components of system 100. In certain embodiments, a manual handle or release control (not shown), can be turned to unseal and open a panel (not shown) of system 100 that gives access to the inside for document removal or machinery repair. In certain exemplary embodiments, an emergency stop and release control (not shown) is optionally available on the outside of housing 104.

The exemplary system of FIG. 1 further includes a dryer 106 configured to dry/dehydrate a document 150, removing excess water to bring document 150 to a moisture content between about 2 to 10%, ideally 6%. Moisture contents above 10% are generally not preferred, as a document with a moisture content greater than 10% is susceptible to mold growth. In an embodiment, dryer 106 dries document 150, removing water therefrom, using forced air generated by one or more variable speed fans 142 (see, e.g., FIG. 8), which in certain embodiments are temperature-controllable, positioned above, below and/or to the side of document 150, generating laminar airflow currents across the top and/or bottom of document 150. In certain embodiments, dryer 106 operably connects with one or more fans 142 which in certain embodiments are located on the exterior of housing 104 (see, e.g., FIG. 2) to create an updraft to generate circulation for the vaporization of water from the fibers of document 150 evenly.

Figure 8:
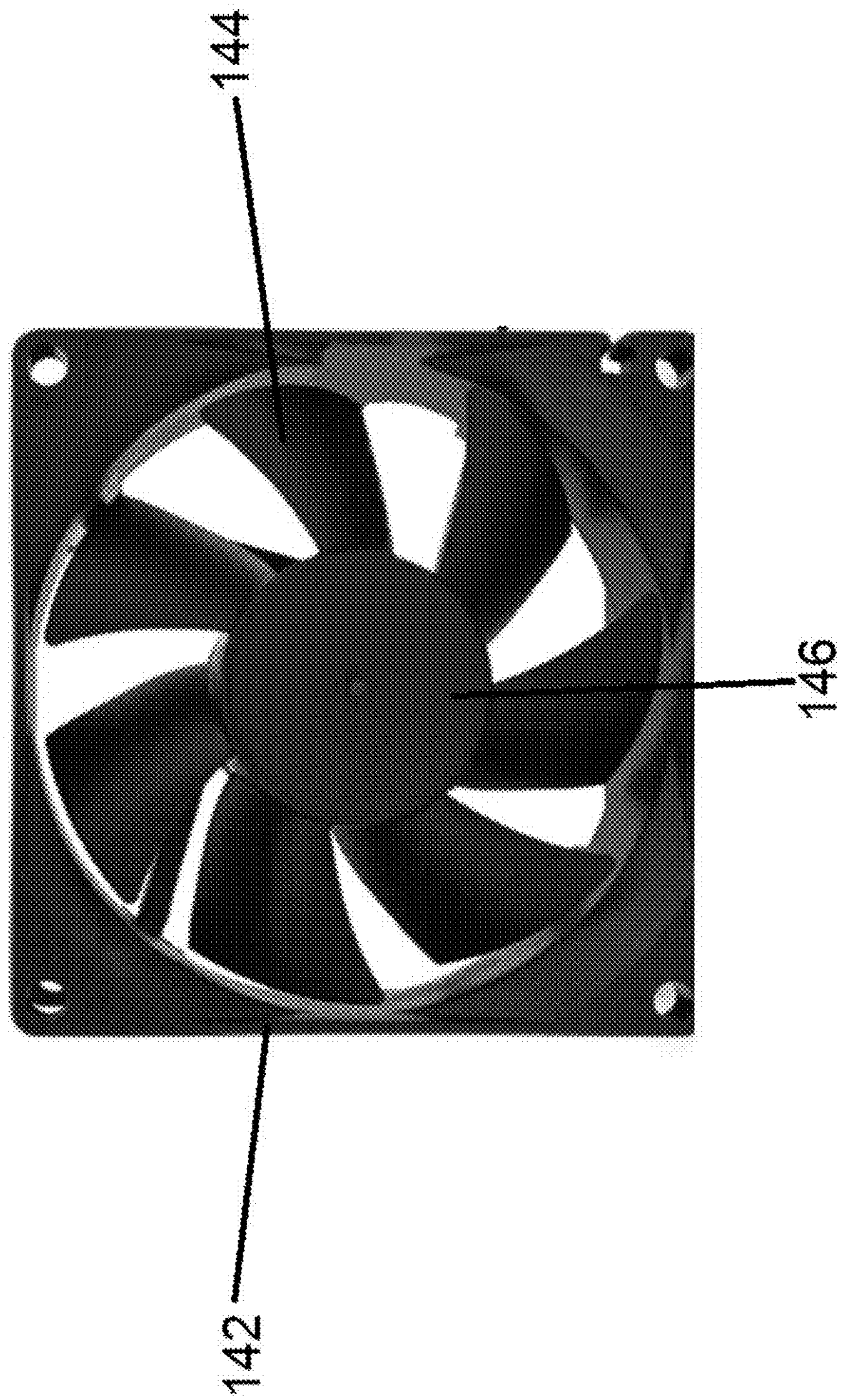
FIG. 8 illustrates an enlarged view of an exemplary dryer.

FIG. 8 depicts an enlarged view of an exemplary fan 142 having blades 144 and fan actuator 146. In accordance with one embodiment, actuator 146 is coupled to controller 132 to control the direction, speed and/or temperature of fan 142. Airspeed and/or air pressure generated by the one or more fans 142 is based on document 150 moisture percentage and the rate of vaporization detected by one or more moisture meters 172 as document 150 moves through dryer 106. Accordingly, fan 142 speeds change to alter the amount of air intake relative to air exhaust to change air speed and/or air pressure in dryer 106. Alternatively, or in addition to in one example, temperature within housing 104 (see, e.g., FIG. 2) is adjustable by one or more temperature-controlled heating elements and/or condensers (not shown) that adjust temperature in response to controller 132 (see, e.g., FIG. 12) based on measurements from the one or more humidity sensors 172 and/or temperature sensors 174. Thus, in certain exemplary embodiments, dryer 106 includes one or more sensors along transportation device 116 to ensure documents are dried to within stable parameters, and/or in proximity to dryer 106 to determine the temperature and moisture content therein. In one embodiment, at least one moisture sensor 172 is placed inside dryer 106, to provide data to controller 132 with respect to the moisture content of document 150, with controller 132 computing a corresponding rotational speed for transportation device 116 (via actuator 134) to dry document 150 to a desired moisture level as detected by at least one moisture sensor 172. In certain exemplary embodiments, controller 132 adjusts the speed of one or more fans 142 and/or adjusts the temperature within dryer 106. Alternatively, or in addition to, as described herein controller 132 adjusts the speed of fans 142 based on data received from one or more sensors 172-178. In certain exemplary embodiments, at least one moisture meter sensor 172 is positioned proximate to and/or in contact with document 150 as it moves along transportation device 116 and detects how much moisture is in document 150, and provides the corresponding data to controller 132, enabling controller 132 to control the speed conveyor 116 and/or at least one fan 142 and/or temperature to ensure document 150 reaches a desired moisture content (such as between 2-10%, with the ideal being 6% at a downstream moisture sensor 172 prior to exiting dryer 106). Controller 132 provides functionality to slow, stop and/or change direction of conveyor 116. Once dried to a predetermined moisture content, document 150 exits dryer 106 and moves to another component such as, for example, cleaning device 108.

Figure 9:
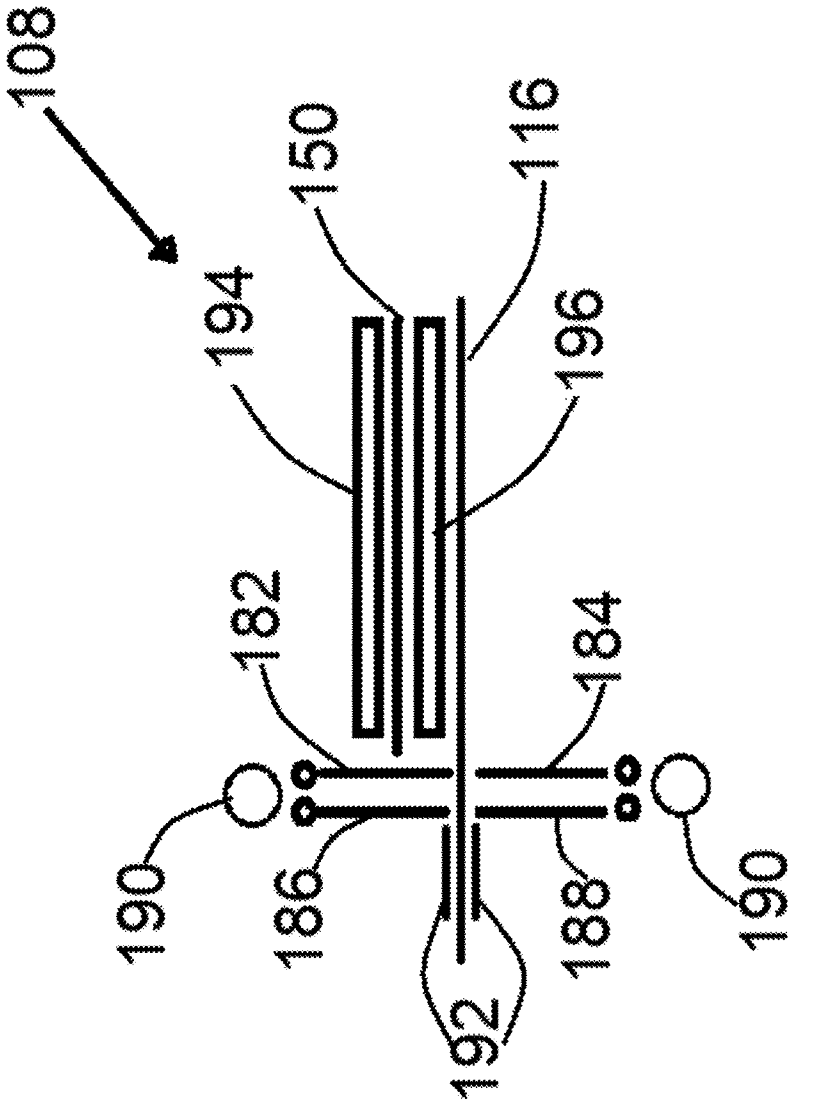
FIG. 9 illustrates an enlarged view of an exemplary cleaning device.

FIG. 9 illustrates an exemplary embodiment of a cleaner 108. Cleaner 108, alone or in combination with vacuum 114, removes dirt, debris, and other particulates from document 150. In the embodiment shown, cleaner 108 includes one or more brushes 182. In certain embodiments, brushes are archival dusting brushes having a soft animal or synthetic hair that do not rub particulates into, smear, or further damage document 150. In the exemplary embodiment of FIG. 9, cleaner 108 (via actuator 134) moves brushes in pushing or pulling sweeping movements. In certain exemplary embodiments, brushes 182 are positioned on opposing sides of transportation device 116. In the embodiment shown, at least one brush 182 has bristles pointing towards one surface of transportation device 116, while at least one other brush 184 has bristles pointing towards an opposing surface of transportation device 116. The bristles of brushes 182 and 184 pass through belt 159 of transportation device 116 such that brushes 182 and 184 contact document 150 on opposite sides to sweep dirt, debris, and other particulates off document 150 as transportation device 116 moves document 150 through cleaner 108. In the exemplary embodiment shown, brushes 182 and 184 are tensioned to create a slight bend in the bristles at the point they contact document 150, creating a tension and force behind the stroke of the bristles as document 150 passes between brushes 182 and 184 as transportation device 116 moves document 150 through cleaner 108. In certain embodiments, brushes 182 and 184 are mounted on one or more bracket (not shown) attached to one or more springs (not shown) and electronically connected to controller 132 and actuator 134. In certain embodiments, one or more of brushes 182 and 184 is mounted on at least one turnable rod (not shown), such that the angle of the brushes 182 and 184 is adjustable to better position brushes 182 and 184 based on the material condition of document 150. In still other embodiments, one or more of brushes 182 and 184 are mounted to a motorized metal arm (not pictured) configured to oscillate brushes 182 and 184 across document 150 to sweep across the page and down at the same time for removal of dirt, debris, and particulates.

Alternatively, brushes 186 and 188 are angled towards exit tray 136 with the bristles of brush 182 facing one side of transportation device 116 and the bristles of brush 184 facing the opposing side. Here, brushes 186 and 188 are angled in the opposite direction of brushes 182 and 184, pointing toward entry tray 138 with bristles angled toward transportation device 116 and contacting the bristles of brush 182 and/or 184. This configuration provides for gentler brush strokes for more damaged documents and enables better access into grooves in document 150. In one example, this configuration is set based on a position of controls exterior to housing 104. This angled configuration creates longer and shorter stroke lengths alternating in the document fibers to coax more stubborn particulates in difficult-to-reach places, such as grooves formed by wear and tear or objects like staples. Brushes 186 and 188 are arranged in a similar fashion such that the arrangement of all the brushes 184-188 appears as an X and/or one or more V shapes when viewed from the side. Alternatively, controller 132 provides instructions to actuator 134 to set a desired configuration.

Certain exemplary embodiments include one or more sponges 192 or absorbent material that collect dirt, dust, and debris from the brushes without rubbing off oils or ink from document 150. In certain of these embodiments, sponge 192 contains at least a small amount of a fast-drying alcohol cleaning solution, so that bristles contacting sponge 192 are cleaned of any debris, dirt, and particulates from the bristles, without requiring brushes be submerged in the cleaning solution liquid or drenched, and are dry prior to touching document 150. This helps avoid smearing, caking of dirt, debris, or other particulates, or additional damage which could potentially occur if the brushes were still wet when they contact document 150.

In certain embodiments, the cleaning solution is equal parts rubbing alcohol and water mixture or 3:4 ratio ethyl alcohol and water mixture meeting archival document protection standards. In certain exemplary embodiments, the cleaning solution is stored in a container (not shown) operably connected with at least one sponge 192 such that sponge 192 can soak in the solution, thereby enabling the at least one sponge 192 to remain sufficiently full of cleaning solution without having to stop the system 100 to refresh sponge 192. In certain embodiments, at least one sponge 192 is cleaned and maintained through a maintenance hatch (not shown) or a removable tray (not shown) which provides access to the at least one sponge 192 to be repaired, replaced, or adjusted. In certain embodiments, the amount a brush contacts a sponge 192 is adjustable based on the amount of dirt, debris, or particulates contaminating the brushes. The position of the brush relative to the at least one sponge 192 is in certain embodiment adjusted by changing a position of an oscillating arm (not shown) attached to one or more of the brushes.

In certain exemplary embodiments, cleaner 108 includes one or more openings 190 operably connected via at least one hose and/or other connection mechanisms known to those of skill in the art to vacuum 114, which sucks air from cleaner 108 through a filter (which can but need not be a HEPA filter) to remove dirt, debris, and particulates removed from document 150. In certain exemplary embodiments, at least one of filters is a HEPA filter rated to remove at least 99.97% of dust, pollen, mold, bacteria, or airborne particles with a size of 0.3 microns (μm). In certain exemplary embodiments, cleaner 108 includes one or more ozone sensors 178 configured to detect air particulate levels, and in certain embodiments to provide an alarm or other indication if ozone levels exceed a certain level. In certain exemplary embodiments, signals from ozone sensors 178 are transmitted to controller 132 which, based on the data, cause controller 132 to slow transportation device 116 to provide a more thorough cleaning of document 150 while allowing additional time for vacuum 114 to remove via openings 190 any particulates contained in the air approximate cleaner 108.

In certain exemplary embodiments, transport device 116 feeds document 150 into a sanitizer 110 configured to irradiate document 150 with ultraviolet (UV) light at a wavelength and intensity sufficient to kill or render inert pathogens such as bacteria, viruses, and/or spores on or in document 150. In one example, the sanitizer 110 is upstream of cleaner 108. Sanitizer 110 includes one or more ultraviolet light sources 152 aimed to at least one side of conveyor 116 to illuminate document 150 with ultraviolet germicidal light (for example in UV-C wavelengths of 250-270 nm) at an intensity and duration sufficient to inactivate 99.9% of pathogens. UV-C is used to disinfect water, air, and surfaces with no chemicals, waste products, or residues left behind. In certain embodiments, additional sources 152 are aimed at the other side of conveyor 116 such that document 150 is irradiated with UV light on both sides. Other wavelengths (from 100-400 nm, for example) can be used in place of or in addition to ultraviolet light to aid in sterilization without departing from the scope of the present subject matter. In certain embodiments, one or more UV sensors 176 provide an indication of the amount and/or intensity of UV light present in sanitizer 110 to controller 132 to maintain UV light at a desired intensity, and in certain embodiments to provide an indication of when one or more sources 152 are energized.

Figure 10:
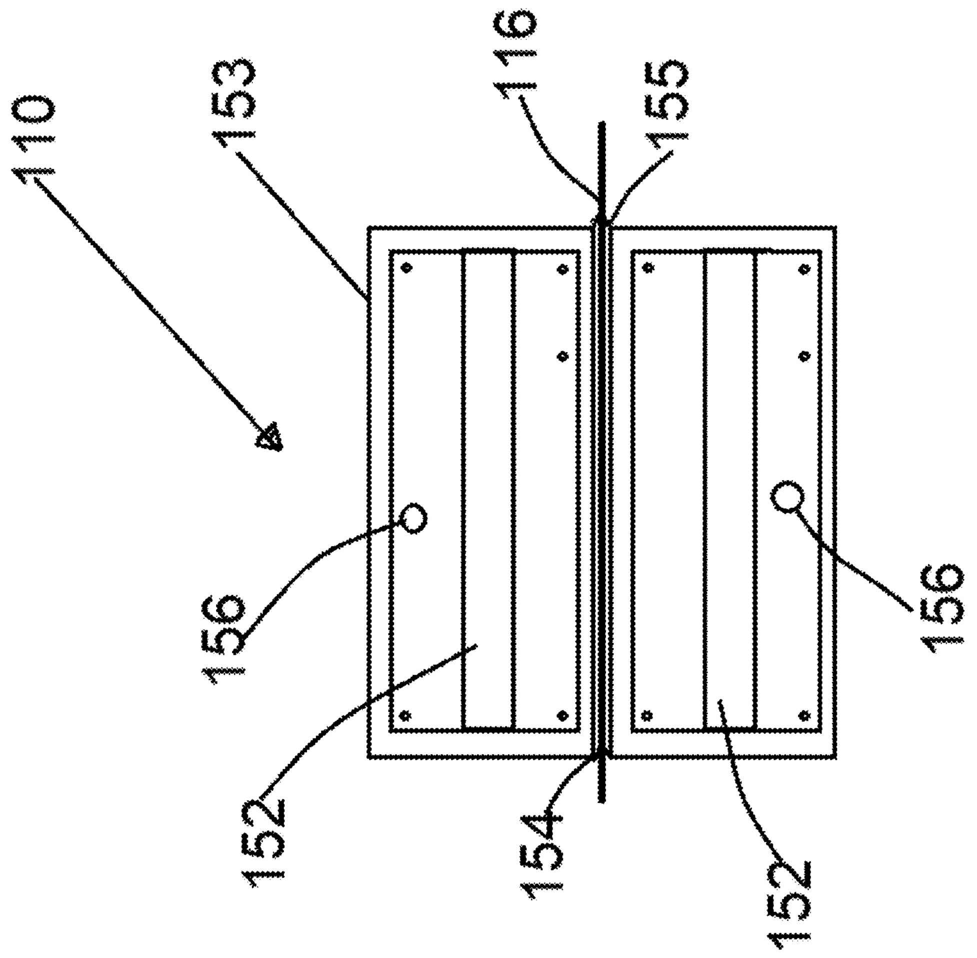
FIG. 10 illustrates an enlarged view of an exemplary sanitizer.

In the exemplary embodiment shown in FIG. 10, sanitizer 110 includes chamber 153 made from one or more opaque materials blocking UV light from escaping sanitizer 110. In the exemplary embodiment shown, chamber 153 includes entry 154 and exit 155. In certain embodiments, entry 154 and exit 155 include a material such as black rubber that acts as a protective curtain that blocks UV light but allows document 150 to pass from entry 154 to exit 155 without damage. Other materials, in place of or in addition to rubber can be used without departing from the scope of the present subject matter. As an example, entry 154 and exit 155 can include any type of protective material that maintains its shape and does not rub, flake, smear, or degrade in the presence of UV light.

In certain exemplary embodiments, sanitizer 110 includes one or more openings 156 operably connected to vacuum 114, which sucks air from sanitizer 110 through a filter (which can but need not be a HEPA filter) to remove ozone and/or airborne particulates. For example, in certain embodiments, one or more filters connected with chamber 153 and vacuum 114 remove particulates produced during remediation. In certain embodiments, at least one of filters is a HEPA filter rated to remove at least 99.97% of dust, pollen, mold, bacteria, or airborne particles with a size of 0.3 microns (μm). In certain exemplary embodiments, sanitizer 110 includes one or more ozone sensors 178 configured to detect and monitor the ozone and/or air particulate levels, and in certain embodiments to provide an alarm or other indication if detected levels exceed a certain amount.

In the exemplary embodiment shown, system 100 includes vacuum 114 (a pump or motor, for example). In one or more embodiments, vacuum 114 is a NILFISK® museum vacuum cleaner operably connecting with one of more of the components of system 100 including but not limited to dryer 106, cleaning device 108, and sanitizer 110 via one or more conduits and/or hoses. Other connections known to those of skill in the art can be used (in place of and/or in addition to conduits and/or hoses) without departing from the scope of the present subject matter. Vacuum creates a negative air pressure such that dirt, debris, detritus, and particulates that could continue to damage the integrity of document 150 are removed from one or more of dryer 106, cleaning device 108, and sanitizer 110. Other vacuum devices known to those of skill in the art can be used in place of and/or in addition to the vacuum described above without departing from the scope of the present subject matter.

Vacuum 114 optionally connects with one or more HEPA filters (not shown) designed to remove harmful bacteria and particulates from the air. This helps protect document 150, as documents that contain particulates will become damaged and deteriorate over time, shortening the lifespan of and compromising the integrity of the document. Thus, vacuum 114 pulls the particulates off the fibers of document 150 and into vacuum 114, optionally through a HEPA filter to remove particulates. In one example, vacuum 114 is positioned proximate to one or more of fan 142, dryer 106, brushes 182-188, and light sources 152 to provide for suction pressure to remove dirt, debris, and particulates.

Figure 11:
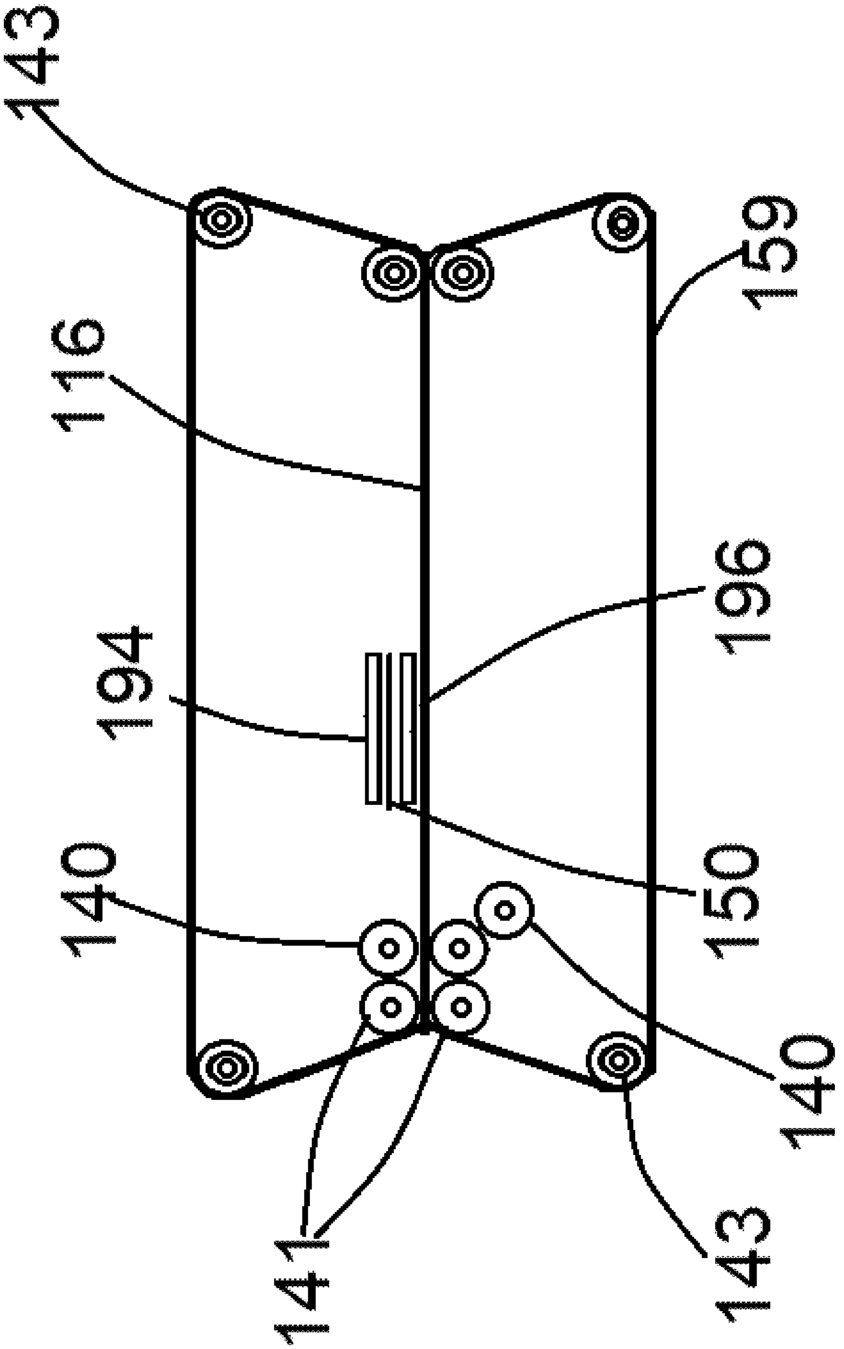
FIG. 11 illustrates an enlarged view of an exemplary transportation device.

In certain exemplary embodiments, system 100 further includes at least one transportation device 116 connecting one or more of dryer 106, cleaning device 108, and sanitizer 110 (see, e.g., FIG. 2). In one embodiment, transportation device 116 includes one or more belts 159 and gears 140 which maintain tension through rollers 141,143 placed in corners of bio-containment system 104 to propel the transportation device 116 (see, e.g., FIG. 11). In one exemplary embodiment, document 150 is transferred onto a first screen 194. Belts 159 travel in a loop to continue cleaning documents. In one exemplary embodiment, first screen 194 maintains the integrity of documents 150 placed within the system 100 and reduces the risk of additional damage to document 150 caused by falling, sliding, slipping, or coming off of the transportation device 116. In certain exemplary embodiments, system 100 further includes a second screen 196 having tension wheels (not shown) which press sponge 192, sponge 194, and document 150 together. This configuration secures document 150, such that document 150 does not move from its relative position on belts 159.

In certain exemplary embodiments screens 192/194 allow air to flow through the transportation device 116, as they are not solid but are instead perforated, with the size of the perforations allowing air to dry the documents and help remove dirt, debris, and other particulates. In certain exemplary embodiments, screens 194/196 allow the bristles of the brushes 182-188 to penetrate therethrough, as well as allowing the UV light to shine on document 150 for sanitation.

In one or more embodiments, screens 194/196 are mesh, for example 1-2 mm thick, and are flat, durable, easy to clean, and in certain embodiments include a non-sticky material that does not rust or rub particulates on to the documents, and which maintains its integrity in a large temperature range (in certain embodiments between 0 and 400 degrees Fahrenheit), are resistant to or immune to UV degradation, and capable of retaining shape without distorting, twisting, turning, or bending. Screens 194/196 are made of one or more materials known to those of skill in the art, including but not limited to polyester mesh, PTFE mesh, PTFE glass, PTFE coated fiberglass, and metals such as aluminum or stainless steel, Teflon, or silicone. The gauge or gauges of the mesh can vary and are dependent upon the state of the fragility of the documents, where more fragile documents are in certain embodiments transported using smaller mesh than larger documents. In certain embodiments, mesh of screens 194/196 is a braided cord woven into the shape of a square or similar design that are not filled in, allowing air to flow through the cords. The larger the micron, the smaller the mm and the tighter the cords are woven together. The connection of the screens 194/196 to transportation device 116 is implemented using one or more of alligator clips, rewoven pin seams, strap hooks, PEEK spirals, bullnose, tabs, or welds.

In certain embodiments, screens 194/196 are configured to be wide and long enough to at least partially cover document 150. Screens 194/196 are dimensioned as would be understood by one of ordinary skill in the art such that they can be conveyed and stretch through and above/below the various system 100 components. Screens 194/196 perforation sizes include (but are not limited to) 2×2 mm, 4×4 mm, and 6×6 mm, which including the brushes, provide sufficient permeability for brushes to touch document 150, while providing sufficient protection using braided cord such that the brushes do not tear or rip document 150, nor does document 150 fall through the holes.

Such screens are approved by the National Archives and Records Administration (NARA) for dusting archival text. Air and vapor molecules are so small they can permeate through the PTFE and PFA molecular structure regardless of openings created through the weaving process. Thus, in one exemplary embodiment, a weaving configuration allows for the brushes 182-188 to pass through the openings of the weave to remove dirt, debris, and other particulates on document 150 while still allowing other liquid molecules, such as water, which are too large to pass through the certain PTFE created structures. As pressure rate increases, the rate of permeation increases linearly. Since air has an inverse volume relative to pressure, this means as pressure rises the air volume decreases.

In certain exemplary embodiments (not shown) one or more autonomous mobile robots with vacuum suction cup multi-finger adaptive end-of-arm tool grippers or alternative end of arm tool to move documents. In certain embodiments, rotary robotic arms with vacuum suction or alternative end of arm tools are configured to remove multiple documents and/or single pages and, in certain embodiments, remove metallic components and fasteners (staples, paper clips, pins, buttons, rubber bands, and the like) from document pages then place them into tray 138 to be conveyed into the bio-containment system 104 for processing. Additional rotary robotic arms with vacuum suction or alternative end-of-arm tools can retrieve documents from tray 136 and place them into boxes for the secondary autonomous mobile robots with vacuum suction cup multi-finger adaptive end-of-arm tool grippers or alternative to transport one or more documents and/or boxes onto transportation device 116.

Certain embodiments include a scanner 112. In the embodiment shown, documents 150 are transferred from sanitizer 110 to scanner 112 via transportation device 116. In certain exemplary embodiments, scanner 112 is an imager or digitizer configured as would be understood by one of ordinary skill in the art to capture a visual representation of document 150. Use of a scanner is exemplary only, as other means of capturing visual representations of images known to those of skill in the art can be used without departing from the scope of the present subject matter.

Figure 12:
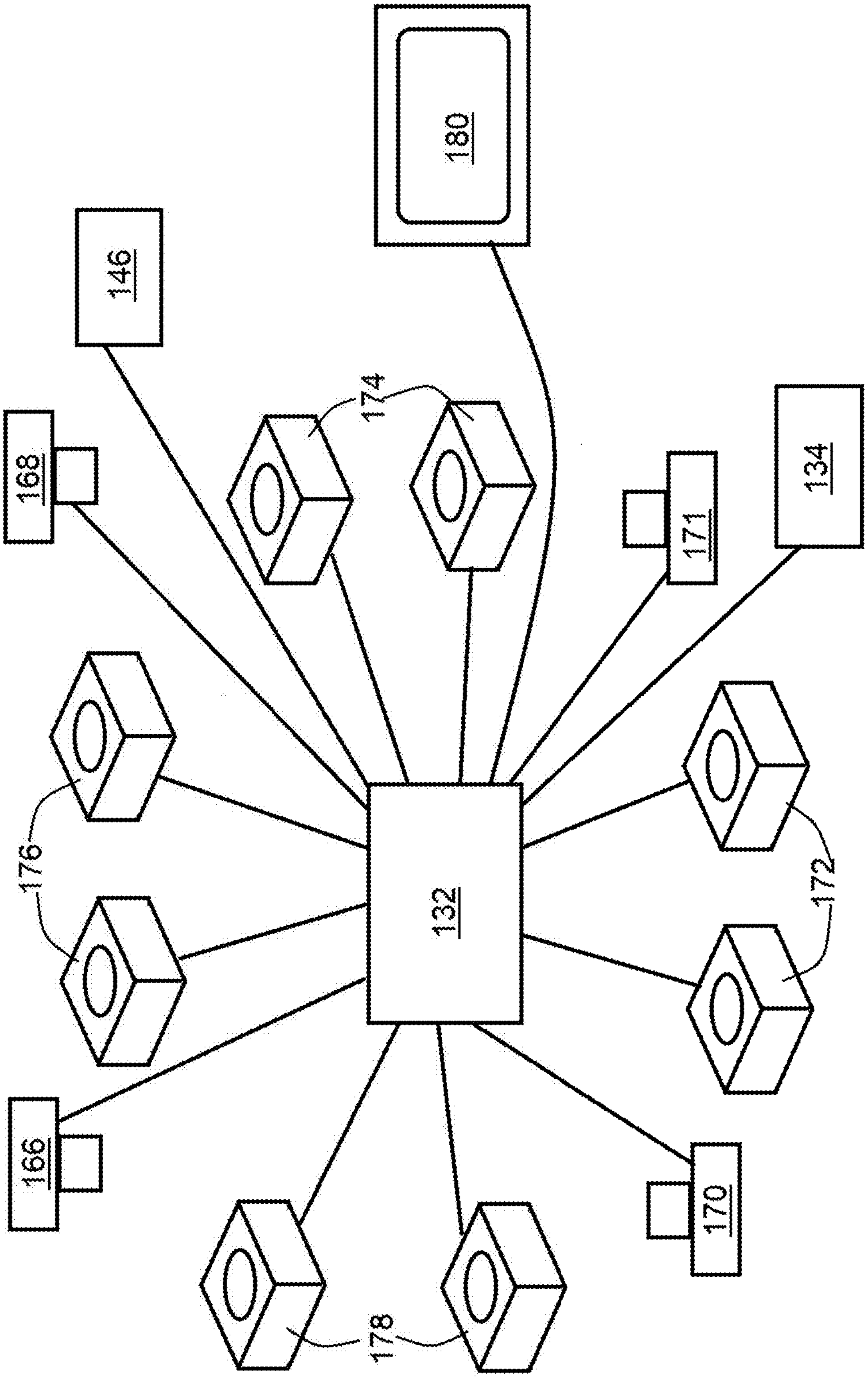
FIG. 12 illustrates a schematic view of exemplary embodiments of a control device, monitor, cameras, and sensors.

FIG. 12 illustrates an exemplary control system 132 (also referred to as a controller 132). Controller 132 includes at least one processor (not shown) as a hardware device for executing software stored in a non-transitory computer-readable medium. The processor can be any custom made or commercially available processor, a central processing unit (CPU), a semiconductor-based microprocessor (in the form of a microchip or chip set, for example), a macroprocessor, or generally any device for executing software instructions. In certain exemplary embodiments, the memory can have a distributed architecture, where various components are situated remote from one another, but can be accessed by system 100. The processor is configured to execute software stored within the memory, to communicate data to and from the memory, and to generally control operations of system 100. When the systems and methods described herein are implemented in software, the methods are stored on any non-transitory computer readable medium for use by or in connection with any computer related system or method. In the context of this document, a non-transitory computer readable medium is an electronic, magnetic, optical, or other physical device or means that can contain or store a computer program for use by or in connection with a computer related system or method. The software in the non-transitory computer-readable medium may include one or more separate programs, and may be in the form of a source program, executable program (object code), script, or any other entity comprising a set of instructions to be performed.

In certain exemplary embodiments, one or more sensors 172-178 provide inputs to controller 132. Certain of these embodiments include one or more sensors selected from the group consisting of moisture sensors 172, temperature sensors 174, UV sensors 176, and ozone sensors 178 operatively connected to and communicating electrically, optically, and/or wirelessly with controller 132. In certain embodiments, system 100 is automatically shut off if an ozone sensor 178 provides an indication to controller 132 ozone is present in system 100 at a level exceeding OSHA safety standards. Other levels can be used instead of or in addition to OSHA safety standards without departing from the scope of the present subject matter. At least one ozone sensors 178 is, in one example, positioned proximate to at least one UV light 152 in sanitizer 110. If detected ozone is above a predetermined threshold, an excessive ozone alert is generated and controller 132 shuts down system 100.

In certain exemplary embodiments, UV sensors 176 provide controller 132 with an indication of whether the UV-C source is on and functioning. In certain exemplary embodiments, moisture sensors 172 provide the water content of documents at several intervals at for example, in or near the entrance to dryer 106, within dryer 106, and in or near the exit of dryer 106 to help determine whether to increase or decrease fan speed and/or adjust and/or increase, decrease, or stop the transportation device 116 via actuator 134. In certain exemplary embodiments, inputs from temperature and/or humidity sensors 172 and/or 174 to controller 132 are used by controller 132 to adjust the fans and/or vacuum pressure and/or to shut the machine off if, for example, system humidity levels and/or temperatures within system 100 exceed certain values. A preferred humidity range is between about 20% and 40% and dependent upon the damage to the documents being remediated if a lower humidity would be preferred. For example, a document with a higher moisture content than 10% would benefit from a lower humidity level (~20%) than a document with a low 2% moisture content. Temperature levels can be adjusted through the temperature-controlled fans via controller 132 and adjustments should be made by personnel depending on the damage of the document, moisture content, and humidity levels. In certain exemplary embodiments, temperature levels are maintained at approximately 65 degrees Fahrenheit. Other temperatures up to approximately 400 degrees Fahrenheit can be maintained without departing from the scope of the present subject matter, as can temperature ranges rather than specific temperatures.

In one embodiment, actuators 134 control the speed and direction of transportation device 116. In certain exemplary embodiments, controller 132 uses the inputs from one or more cameras/imaging devices 170 to control the speed of one of more of fans 142. In certain embodiments, one or more UV sensors 176 provide controller 132 with the data of whether the UV-C light is on by monitoring the amount of ultraviolet light in sanitizer 110. In certain exemplary embodiments, at least one display 180 provides a visual indication from one or cameras/imaging devices 170 for whether to change airflow to cleaning device 108. In certain exemplary embodiments, at least one ozone sensor 178 monitors ozone levels in sanitizer 110, and in certain embodiments one or more moisture sensors 172 provide one or more inputs to controller 132 monitor regarding the humidity level of document 150. In an exemplary embodiment, controller 132 connects to a one or more displays 180 to observe operations in system 100. The number and type of sensors shown is exemplary only, as other numbers and types of sensors can be used without departing from the scope of the present subject matter.

Figure 13:
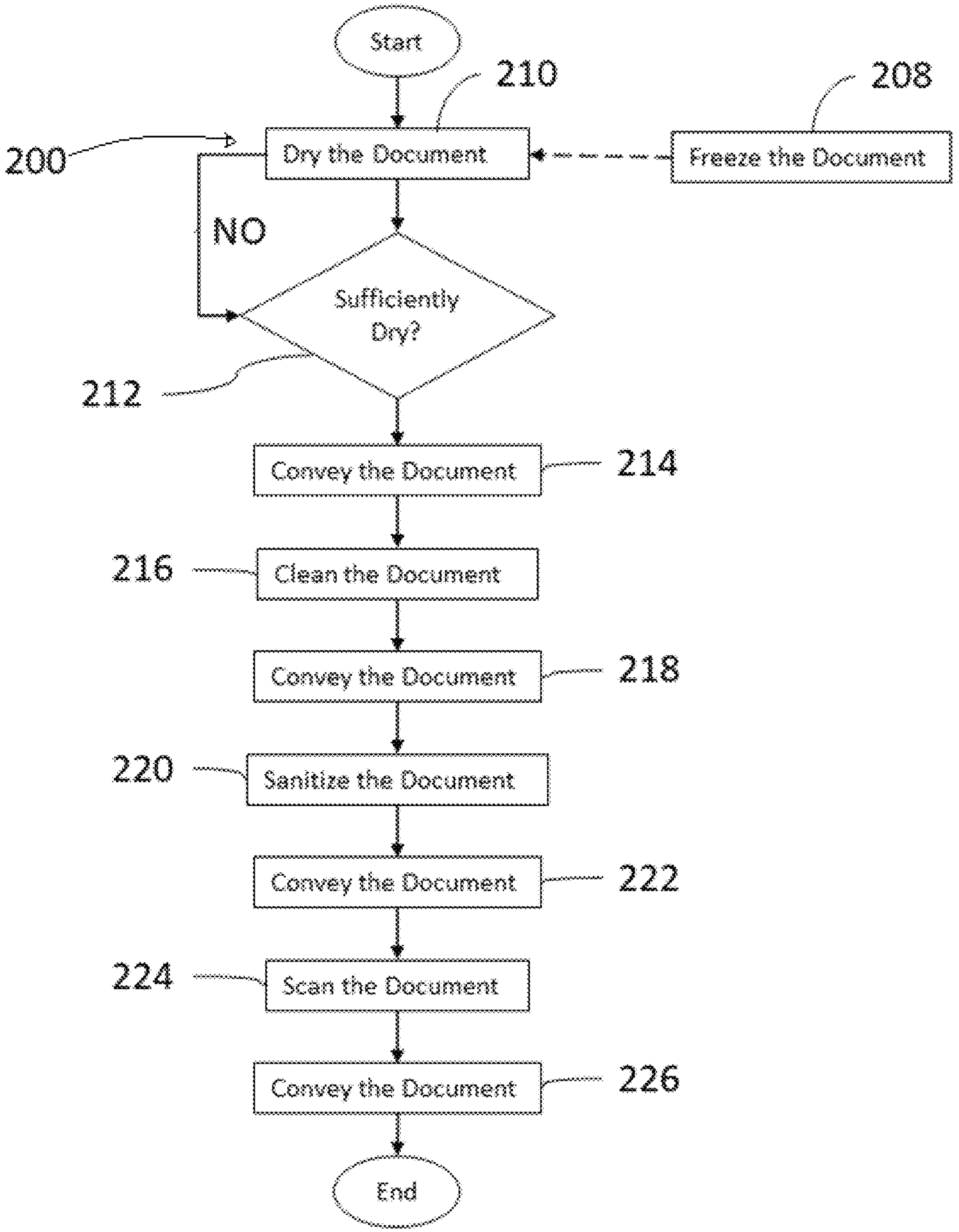
FIG. 13 illustrates a flow chart of an exemplary document remediation method.

FIG. 13 illustrates a flow chart depicting an exemplary document remediation method 200. Method 200 includes optional step 208, in which document 150 is freeze dried. In step 210 document 150 is input into bio-containment system 104 and conveyed on conveyer 116 to dryer 106 to be dried. At step 212 system 100 determines if a document is sufficiently dry using one or more sensors 172-178 and controller 132. If system 100 determines that a document is not sufficiently dry, controller 132 adjusts the speed of conveyer 116 and repeats step 210. If document 150 is dried to a desired level, in step 214, document 150 is conveyed to cleaning device 108, to be cleaned and vacuumed via cleaning device 108 and vacuum 114, respectively, at step 216. At step 218 document 150 is conveyed to sanitizer 110 to be sanitized at step 220. At step 222, document 150 optionally conveyed at step 222 to a scanner for digitization at step 224. At step 226 document 150 is conveyed at step 226 via transportation device 116 to output tray 136. In the exemplary method shown vacuuming can take place during one or more of steps described above to remove debris and remove any excess ozone as documents proceed through remediation.

The embodiments discussed herein are exemplary only, as other variations can be employed without departing from the scope of the present subject matter. Variations include but are not limited to larger or smaller scale versions to accommodate larger or smaller documents, maps, and other paper-based materials, and/or embodiments configured to remediate multiple pages at a time for increased throughput. In certain other exemplary embodiments, some or all portions of system 100 are modular, with sections of system 100 configured connect via one or more inter-locking mechanisms.

CONCLUSION

A number of embodiments have been described. Nevertheless, it will be understood that various modifications can be made without departing from the spirit and scope of this disclosure. One skilled in the art will also readily recognize that where members are grouped together in a common manner, such as in a Markush group, the present subject matter encompasses not only the entire group listed as a whole, but each member of the group individually and all possible subgroups of the main group. Accordingly, for all purposes, the present subject matter encompasses not only the main group, but also the main group absent one or more of the group members. The present subject matter also envisages the explicit exclusion of one or more of any of the group members disclosed or claimed.

It will be further understood that the systems and methods described herein are exemplary only. Many additional changes in the details, materials, steps, and arrangement of parts, which have been herein described and illustrated to explain the nature of the subject matter, can be made by those skilled in the art within the principle and scope of the invention as expressed in the appended claims. The steps of the methods described above can be performed in any order unless the order is restricted in the discussion. Any element of any embodiment can be used in any other embodiment and/or substituted for an element of any other embodiment unless specifically restricted in the discussion.

What is claimed is:

1. A document remediation system comprising:

a freezer configured to freeze a document;

a dryer configured to dry the document and output a dried document;

a cleaning device configured to receive the dried document, remove debris therefrom, and output a cleaned document; and a sanitizer configured to receive the cleaned document, disinfect the cleaned document, and output a remediated document.

2. The document remediation system of claim 1 further comprising a vacuum connected to at least one of the dryer, the cleaning device, and the sanitizer and configured to remove document debris from one or more of the dryer, the cleaning device, and the sanitizer.

3. The document remediation device of claim 1 further comprising a transportation device interconnecting the dryer, the cleaning device and the sanitizer, wherein the transportation device is configured to convey the document through the dryer, the cleaning device, and the sanitizer.

4. The document remediation system of claim 3, wherein the transportation device includes a first and second screen to retain the document as the document is conveyed through the document remediation system.

5. The document remediation system of claim 3 further comprising an actuator coupled to the transportation device to move the transportation device and control the speed thereof.

6. The document remediation system of claim 1, further comprising a scanner configured to receive and digitize the remediated document.

7. The document remediation system of claim 6, wherein the scanner is connected to the sanitizer via a conveyance device.

8. The document remediation system of claim 1, wherein the dryer includes one or more fans positioned to dry the document.

9. The document remediation system of claim 8 wherein at least one of the one or more fans are positioned to blow across a face of the document.

10. The document remediation system of claim 8 further including one or more sensors proximate at least the dryer and configured to detect at least moisture content of the document within the dryer.

11. The document remediation system of claim 10 wherein a drying time of the document in the dryer is determined by the moisture content of the document as detected by the one or more sensors.

12. The document remediation system of claim 1, wherein the cleaning device includes at least brushes to remove the debris from the document.

13. The document remediation system of claim 1, wherein the sanitizer includes one or more UV lights.

14. The document remediation system of claim 1, wherein the dryer, cleaning device and sanitization device are modular components.

15. The document remediation system of claim 1 further comprising a containment system containing the dryer, the cleaning device, and the sanitizer.

16. A document remediation system comprising:

a dryer configured to dry a document and output a dried document;

one or more sensors configured to detect a moisture content of the document within the dryer;

a cleaning device configured to receive the dried document, remove debris therefrom, and output a cleaned document;

a sanitizer configured to receive the cleaned document, disinfect the cleaned document, and output a remediated document;

a scanner configured to receive and digitize the remediated document;

a vacuum connected to at least one of the dryer, the cleaning device and the sanitizer and configured to remove document debris from one or more of the dryer, the cleaning device, and the sanitizer; and a transportation device interconnecting the dryer, the cleaning device and the sanitizer, the transportation device being configured to receive the document and convey the document through at least the dryer, the cleaning device, and the sanitizer.

17. The document remediation system of claim 16 further comprising a freezer configured to freeze-dry documents.

18. A method for remediating a document comprising:

receiving a document;

freeze-drying the document;

automatically adjusting a time for drying the document and outputting a freeze-dried document;

cleaning the freeze-dried document, removing debris therefrom, and outputting a cleaned document;

sanitizing the cleaned document and outputting a remediated document.

* * * * *